(12) United States Patent
Holmes

(10) Patent No.: US 10,405,173 B1
(45) Date of Patent: Sep. 3, 2019

(54) METHOD AND SYSTEMS OF COLLECTING AND SEGMENTING DEVICE SENSOR DATA WHILE IN TRANSIT VIA A NETWORK

(71) Applicant: Sprint Communications Company L.P., Overland Park, KS (US)

(72) Inventor: Geoffrey A. Holmes, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 825 days.

(21) Appl. No.: 13/911,074

(22) Filed: Jun. 5, 2013

(51) Int. Cl.
*H04W 8/18* (2009.01)
*G06Q 30/02* (2012.01)

(52) U.S. Cl.
CPC ........ *H04W 8/186* (2013.01); *G06Q 30/0269* (2013.01)

(58) Field of Classification Search
CPC .............. G06Q 30/0201; G06Q 50/01; G06Q 30/0269; H04W 8/186; H04W 8/18
USPC ......... 705/14.54, 14.66, 14.41, 319; 707/733
See application file for complete search history.

(56) References Cited

U.S. PATENT DOCUMENTS

| | | | |
|---|---|---|---|
| 5,636,346 A | 6/1997 | Saxe | |
| 5,761,648 A | 6/1998 | Golden et al. | |
| 5,848,396 A | 12/1998 | Gerace | |
| 5,848,397 A | 12/1998 | Marsh et al. | |
| 5,918,014 A | 6/1999 | Robinson | |
| 5,918,041 A | 6/1999 | Berstis | |
| 5,933,811 A | 8/1999 | Angles et al. | |
| 5,937,392 A | 8/1999 | Alberts | |
| 5,974,398 A | 10/1999 | Hanson et al. | |
| 6,202,023 B1 | 3/2001 | Hancock et al. | |
| 6,233,566 B1 | 5/2001 | Levine et al. | |
| 6,266,649 B1 | 7/2001 | Linden et al. | |
| 6,286,005 B1 | 9/2001 | Cannon | |
| 6,317,722 B1 | 11/2001 | Jacobi et al. | |
| 6,321,983 B1 | 11/2001 | Katayanagi et al. | |

(Continued)

FOREIGN PATENT DOCUMENTS

| | | | |
|---|---|---|---|
| WO | WO03044703 A1 | | 5/2003 |
| WO | WO2012093396 | * | 1/2012 |

(Continued)

OTHER PUBLICATIONS

Office Action—Restriction requirement dated Jun. 17, 2008, U.S. Appl. No. 11/405,195, filed Apr. 17 2006, 7 pages.

(Continued)

*Primary Examiner* — Mario C. Iosif

(57) ABSTRACT

A network system for collecting and segmenting device sensor data is disclosed. The system comprises a memory. The system further comprises a classification application configured to classify a subscriber profile based on at least one interaction record. The system also comprises a gateway configured to receive a first message from a mobile device comprising a user identification based on one or more mobile device specific values and the first interaction record based on a detection of an interaction between a first mobile device user and the mobile device, assign a subscriber profile with the first message, wherein the subscriber profile is based at least on the user identification, add at least the first interaction record to the assigned subscriber profile, and transmit the subscriber profile to the classification application.

20 Claims, 7 Drawing Sheets

(56) References Cited

U.S. PATENT DOCUMENTS

| | | |
|---|---|---|
| 6,332,127 B1 | 12/2001 | Bandera et al. |
| 6,654,725 B1 | 11/2003 | Langheinrich et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,680,899 B1 | 3/2010 | Barnes et al. |
| 7,698,335 B1 * | 4/2010 | Vronay ............. G06F 17/30038 707/737 |
| 7,788,644 B2 | 8/2010 | Koduru et al. |
| 7,797,565 B1 | 9/2010 | Tran et al. |
| 7,801,518 B1 | 9/2010 | Urbanek |
| 7,840,498 B2 | 11/2010 | Frank et al. |
| 7,840,551 B2 * | 11/2010 | Wong ................. G06F 21/6227 707/713 |
| 7,958,005 B2 | 6/2011 | Dangaltchev |
| 7,974,616 B1 | 7/2011 | Urbanek |
| 8,214,454 B1 | 7/2012 | Barnes et al. |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 8,788,690 B2 | 7/2014 | Short et al. |
| 9,043,432 B2 | 5/2015 | Ahopelto |
| 9,219,790 B1 * | 12/2015 | Filev ........................ H04L 67/22 |
| 9,275,390 B1 | 3/2016 | Barnes et al. |
| 9,319,379 B1 | 4/2016 | Burcham et al. |
| 9,331,983 B2 * | 5/2016 | Zhou .................. H04L 63/0281 |
| 9,374,335 B2 | 6/2016 | Burcham et al. |
| 9,411,780 B1 * | 8/2016 | Awad ...................... G06Q 50/01 |
| 9,818,133 B1 | 11/2017 | Bell et al. |
| 9,836,771 B1 | 12/2017 | Burcham et al. |
| 9,984,395 B1 | 5/2018 | Burcham et al. |
| 10,013,707 B1 | 7/2018 | Burcham et al. |
| 10,055,757 B1 | 8/2018 | Burcham et al. |
| 2001/0014601 A1 | 8/2001 | Kuwabara |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0004855 A1 | 1/2002 | Cox et al. |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0023482 A1 | 1/2003 | Messner et al. |
| 2003/0028451 A1 | 2/2003 | Ananian |
| 2003/0032409 A1 | 2/2003 | Hutcheson et al. |
| 2003/0046139 A1 | 3/2003 | Beman et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0211783 A1 | 9/2005 | Chou |
| 2005/0215238 A1 | 9/2005 | Macaluso |
| 2005/0228754 A1 | 10/2005 | Pezzaniti et al. |
| 2005/0229047 A1 | 10/2005 | Hanes et al. |
| 2005/0245246 A1 | 11/2005 | Munch et al. |
| 2005/0246394 A1 | 11/2005 | Neri |
| 2005/0251856 A1 | 11/2005 | Araujo et al. |
| 2005/0256759 A1 | 11/2005 | Acharya et al. |
| 2005/0278296 A1 | 12/2005 | Bostwick |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0178932 A1 | 8/2006 | Lang |
| 2006/0209884 A1 | 9/2006 | MacMullan et al. |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2006/0271690 A1 | 11/2006 | Banga et al. |
| 2007/0005647 A1 | 1/2007 | Cugi et al. |
| 2007/0022009 A1 | 1/2007 | Cataldi et al. |
| 2007/0024580 A1 * | 2/2007 | Sands ...................... G06F 3/011 345/156 |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0118425 A1 | 5/2007 | Yruski et al. |
| 2007/0127500 A1 | 6/2007 | Maeng |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2007/0291789 A1 * | 12/2007 | Kutt ...................... G06Q 30/00 370/467 |
| 2008/0004884 A1 | 1/2008 | Flake et al. |
| 2008/0010137 A1 | 1/2008 | Ho et al. |
| 2008/0040175 A1 | 2/2008 | Dellovo |

(56) References Cited

U.S. PATENT DOCUMENTS

| | | |
|---|---|---|
| 2008/0065476 A1 | 3/2008 | Klein et al. |
| 2008/0082412 A1 | 4/2008 | Tallyn et al. |
| 2008/0097851 A1 | 4/2008 | Bemmel et al. |
| 2008/0104637 A1 | 5/2008 | Rodriguez et al. |
| 2008/0120565 A1 | 5/2008 | Stiso et al. |
| 2008/0126515 A1 | 5/2008 | Chambers et al. |
| 2008/0129758 A1* | 6/2008 | Fox .................. H04N 1/32128 345/661 |
| 2008/0140476 A1 | 6/2008 | Anand et al. |
| 2008/0147478 A1 | 6/2008 | Mall et al. |
| 2008/0228583 A1 | 9/2008 | MacDonald et al. |
| 2009/0029721 A1 | 1/2009 | Doraswamy |
| 2009/0048977 A1 | 2/2009 | Aggarwal et al. |
| 2009/0070129 A1 | 3/2009 | Inbar et al. |
| 2009/0076899 A1 | 3/2009 | Gbodimowo |
| 2009/0099931 A1 | 4/2009 | Aaltonen et al. |
| 2009/0150215 A1 | 6/2009 | Kalb et al. |
| 2009/0154340 A1 | 6/2009 | Kumaresan et al. |
| 2009/0157512 A1 | 6/2009 | King |
| 2009/0198580 A1 | 8/2009 | Broberg et al. |
| 2009/0217354 A1 | 8/2009 | Blum et al. |
| 2009/0222329 A1 | 9/2009 | Ramer et al. |
| 2009/0247193 A1 | 10/2009 | Kalavade |
| 2009/0256858 A1 | 10/2009 | Ogikubo et al. |
| 2009/0265245 A1 | 10/2009 | Wright |
| 2009/0271255 A1 | 10/2009 | Utter et al. |
| 2009/0292608 A1 | 11/2009 | Polachek |
| 2010/0082422 A1 | 4/2010 | Heilig et al. |
| 2010/0082429 A1 | 4/2010 | Samdadiya et al. |
| 2010/0119111 A1 | 5/2010 | Helfman et al. |
| 2010/0130178 A1 | 5/2010 | Bennett et al. |
| 2010/0222035 A1 | 9/2010 | Robertson et al. |
| 2010/0228592 A1 | 9/2010 | Anderson et al. |
| 2010/0251169 A1* | 9/2010 | Kimchi .................. G06Q 10/10 715/808 |
| 2010/0274815 A1* | 10/2010 | Vanasco ............ G06F 17/30867 707/798 |
| 2010/0299329 A1* | 11/2010 | Emanuel ........... G06F 17/30867 707/737 |
| 2011/0082939 A1 | 4/2011 | Montemurro et al. |
| 2011/0131109 A1 | 6/2011 | Pappas et al. |
| 2011/0153827 A1 | 6/2011 | Yengalasetti et al. |
| 2011/0161512 A1 | 6/2011 | Wang et al. |
| 2011/0239288 A1 | 9/2011 | Cross et al. |
| 2011/0246267 A1 | 10/2011 | Williams et al. |
| 2011/0246890 A1 | 10/2011 | Mellamphy et al. |
| 2011/0258049 A1 | 10/2011 | Ramer et al. |
| 2011/0263196 A1 | 10/2011 | Saros et al. |
| 2011/0270687 A1 | 11/2011 | Bazaz |
| 2011/0288913 A1 | 11/2011 | Waylonis et al. |
| 2012/0059696 A1 | 3/2012 | Theberge et al. |
| 2012/0072271 A1 | 3/2012 | Dessert et al. |
| 2012/0123830 A1 | 5/2012 | Svendsen et al. |
| 2012/0170521 A1 | 7/2012 | Vogedes et al. |
| 2012/0179536 A1 | 7/2012 | Kalb et al. |
| 2012/0215911 A1 | 8/2012 | Raleigh et al. |
| 2012/0226819 A1 | 9/2012 | Sylvain |
| 2013/0006743 A1 | 1/2013 | Moore et al. |
| 2013/0018714 A1 | 1/2013 | George |
| 2013/0060631 A1 | 3/2013 | Corson et al. |
| 2013/0139264 A1 | 5/2013 | Brinkley et al. |
| 2013/0211925 A1 | 8/2013 | Holland |
| 2013/0211941 A1 | 8/2013 | Hallowell et al. |
| 2013/0304586 A1 | 11/2013 | Angles et al. |
| 2013/0311293 A1 | 11/2013 | Ward et al. |
| 2013/0331027 A1 | 12/2013 | Rose et al. |
| 2014/0059141 A1* | 2/2014 | Belkin .................. H04L 51/12 709/206 |
| 2014/0066029 A1 | 3/2014 | Brennan et al. |
| 2014/0080467 A1 | 3/2014 | Urbanek |
| 2014/0089113 A1* | 3/2014 | Desai .................. G06Q 20/322 705/16 |
| 2014/0136314 A1 | 5/2014 | Kiet et al. |
| 2014/0162685 A1 | 6/2014 | Edge |
| 2014/0278953 A1 | 9/2014 | Ismail et al. |
| 2014/0337090 A1* | 11/2014 | Tavares .............. G06Q 30/0201 705/7.29 |
| 2014/0379448 A1 | 12/2014 | Gregory |
| 2014/0379467 A1 | 12/2014 | Huang et al. |
| 2015/0074204 A1 | 3/2015 | Burcham et al. |
| 2015/0121418 A1 | 4/2015 | Jain et al. |

FOREIGN PATENT DOCUMENTS

| | | | |
|---|---|---|---|
| WO | WO2012093396 | * | 7/2012 |
| WO | WO2013126759 A2 | | 8/2013 |
| WO | WO2015038562 A1 | | 3/2015 |

OTHER PUBLICATIONS

Office Action dated Aug. 15, 2008, U.S. Appl. No. 11/405,195, filed Apr. 17 2006, 12 pages.

Final Office Action dated Feb. 26, 2009, U.S. Appl. No. 11/405,195, 17 pages.

Advisory Action dated May 7, 2009, U.S. Appl. No. 11/405,195, 2 pages.

Office Action dated Aug. 18, 2009, U.S. Appl. No. 11/405,195, 17 pages.

Final Office Action dated Oct. 27, 2010, U.S. Appl. No. 11/405,195, filed Apr. 17, 2006.

Office Action dated Feb. 8, 2011, U.S. Appl. No. 11/405,195, filed Apr. 17, 2006.

Final Office Action dated Jul. 22, 2011, U.S. Appl. No. 11/405,195, filed Apr. 17, 2006.

Advisory Action dated Oct. 14, 2011, U.S. Appl. No. 11/405,195, filed Apr. 17, 2006.

Office Action dated Apr. 6, 2012, U.S. Appl. No. 11/405,195, filed Apr. 17, 2006.

Notice of Allowance dated Dec. 6, 2012, U.S. Appl. No. 11/405,195, filed Apr. 17, 2006.

Office Action dated Feb. 27, 2009, U.S. Appl. No. 11/433,301, filed May 12, 2006, 13 pages.

Notice of Allowance dated Oct. 26, 2009, U.S. Appl. No. 11/433,301, filed May 12, 2006, 7 pages.

Notice of Allowance dated Mar. 5, 2012, U.S. Appl. No. 12/686,188, filed Jan. 12, 2010.

Office Action dated Jun. 17, 2008, U.S. Appl. No. 11/403,614, filed Apr. 13, 2006, 7 pages.

Office Action dated Aug. 27, 2008, U.S. Appl. No. 11/403,614, filed Apr. 13, 2006, 11 pages.

Final Office Action dated Mar. 4, 2009, U.S. Appl. No. 11/403,614, filed Apr. 13, 2006, 12 pages.

Advisory Action dated May 7, 2009, U.S. Appl. No. 11/403,614, filed Apr. 13, 2006, 3 pages.

Office Action dated Aug. 20, 2009, U.S. Appl. No. 11/403,614, filed Apr. 13, 2006, 11 pages.

Final Office Action dated Nov. 8, 2010, U.S. Appl. No. 11/403,614, filed Apr. 13, 2006.

Office Action dated Dec. 3, 2012, U.S. Appl. No. 11/403,614, filed Apr. 13, 2006.

Final Office Action dated Jun. 10, 2013, U.S. Appl. No. 11/403,614, filed Apr. 13, 2006.

Advisory Action dated Aug. 22, 2013, U.S. Appl. No. 11/403,614, filed Apr. 13, 2006.

Office Action dated Nov. 3, 2008, U.S. Appl. No. 11/438,540, filed May 22, 2006, 14 pages.

Final Office Action dated Apr. 28, 2009, U.S. Appl. No. 11/438,540, filed May 22, 2006, 16 pages.

Advisory Action dated Jul. 10, 2009, U.S. Appl. No. 11/438,540, filed May 22, 2006, 3 pages.

Office Action dated Oct. 16, 2009, U.S. Appl. No. 11/438,540, filed May 22, 2006, 12 pages.

Final Office Action dated Apr. 20, 2010, U.S. Appl. No. 11/438,540, filed May 22, 2006, 26 pages.

Advisory Action dated Jul. 2, 2010, U.S. Appl. No. 11/438,540, filed May 22, 2006, 4 pages.

(56) References Cited

OTHER PUBLICATIONS

Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiners Answer dated Oct. 27, 2011, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiners Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Examiner's Answer dated Nov. 8, 2010, U.S. Appl. No. 11/491,387, filed Jul. 21, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Bell, Timothy L., et al., entitled "Method for Consumer Profile Consolidation Using Mobile Network Identification," filed Oct. 20, 2014, U.S. Appl. No. 14/518,504.
Arivukkarasu, Anand, et al., entitled "Telecom Services to Support Retail Fuel Stocking Logistics," filed Nov. 12, 2014, U.S. Appl. No. 14/539,715.
Decision on Appeal dated Apr. 28, 2015, U.S. Appl. No. 11/438,540, filed May 22, 2006.
Office Action dated Feb. 25, 2015, U.S. Appl. No. 11/474,880, filed Jun. 26, 2006.
Final Office Action date Mar. 2, 2015, U.S. Appl. No. 11/557,939, filed Nov. 8, 2006.
Examiner's Answer dated Mar. 12, 2015, U.S. Appl. No. 12/259,187, filed Oct. 27, 2008.
FAIPP Pre-Interview Communication dated Apr. 3, 2015, U.S. Appl. No. 14/150,832, filed Jan. 9, 2014.
Thierer, et al., "Privacy Solutions (Part 2): Adblock Plus," Technology Liberation Front, Sep. 8, 2008, on line at techliberation.com.
Burcham, Robert H., et al., entitled "IP Address Hashing in Advertisement Gateway," filed Jan. 21, 2014, U.S. Appl. No. 14/160,196.
Burcham, Robert H., et al., entitled "Client Mediation and Integration to Advertisement Gateway," filed Jan. 21, 2014, U.S. Appl. No. 14/160,206.
Burcham, Robert H., et al., entitled "Address Modification for Advertisement Mediation," filed Jan. 21, 2014, U.S. Appl. No. 14/160,215.
Burcham, Robert H., et al., entitled "Advertisement Mediation of Supply-Demand Communications," filed Jan. 21, 2014, U.S. Appl. No. 14/160,224.
Delker, Jason R., et al., entitled, "Enhanced Dialer for a Mobile Communication Device," filed Mar. 4, 2015, U.S. Appl. No. 14/639,057.
Ferrante, Piero D., et al., entitled, "System and Method for Subscriber Cluster Synthesis," filed Feb. 11, 2015, U.S. Appl. No. 14/619,689.
Notice of Allowance dated Jul. 16, 2015, U.S. Appl. No. 11/438,540, filed May 22, 2006.
Final Office Action dated Aug. 31, 2015, U.S. Appl. No. 11/474,880, filed Jun. 26, 2006.
FAIPP Pre-Interview Communication dated Sep. 23, 2015, U.S. Appl. No. 13/956,367, filed Aug. 1, 2013.
FAIPP Office Action dated Jul. 2, 2015, U.S. Appl. No. 14/150,832, filed Jan. 9, 2014.
FAIPP Pre-Interview Communication dated Sep. 18, 2015, U.S. Appl. No. 14/494,601, filed Sep. 24, 2014.
Wikipedia, "Foursuare," https://en.wikipedia.org/w/index.php?title=Foursquare&oldid=681836736, Mar. 2009, last accessed on Sep. 25, 2015.
Belser, John E., et al., entitled "End User Participation in Mobile Advertisement," filed Sep. 24, 2014, U.S. Appl. No. 14/494,601.
Advisory Action dated Oct. 29, 2015, U.S. Appl. No. 11/474,880, filed Jun. 26, 2006.
Supplemental Advisory Action dated Nov. 2, 2015, U.S. Appl. No. 11/474,880, filed Jun. 26, 2006.
Advisory Action date May 18, 2015, U.S. Appl. No. 11/557,939, filed Nov. 8, 2006.
Office Action date Dec. 17, 2015, U.S. Appl. No. 11/557,939, filed Nov. 8, 2006.
FAIPP Pre-Interview Communication dated Nov. 18, 2015, U.S. Appl. No. 14/024,629, filed Sep. 1, 2013.
Notice of Allowance dated Dec. 16, 2015, U.S. Appl. No. 13/956,367, filed Aug. 1, 2013.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
First Action Interview Office Action dated Dec. 17, 2015, U.S. Appl. No. 14/494,601, filed Sep. 24, 2014.
Final Office Action dated Jun. 29, 2010, U.S. Appl. No. 11/558,021, filed Nov. 9, 2006, 28 pages.
Advisory Action dated Sep. 22, 2010, U.S. Appl. No. 11/558,021, filed Nov. 9, 2006, 3 pages.
Office Action dated Jun. 13, 2013, U.S. Appl. No. 11/558,021, filed Nov. 9, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006, 3 pages.
Examiner's Answer dated Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action date Aug. 5, 2014, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 7, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.

(56) References Cited

OTHER PUBLICATIONS

Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Mechandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cyle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with"Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developerandroid.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?,"http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Barnes, James D., et al., entitled, "Systems and Methods for State-Based Advertisement Messaging Across Media Types," filed May 22, 2006, U.S. Appl. No. 11/438,540.
Barnes, James D., et al., entitled, "In-Flight Campaign Optimization," filed Nov. 9, 2006, U.S. Appl. No. 11/558,021.
Barnes, James D., et al., entitled "Mobile-Device-Based Coupon Management Systems and Methods," filed Apr. 13, 2006, U.S. Appl. No. 11/403,614.
Barnes, James D., et al., entitled, "Inventory Management Integrating Subscriber and Targeting Data," Jun. 26, 2006, U.S. Appl. No. 11/474,880.
Barnes, James D., et al., entitled, "Behavioral Analysis Engine for Profiling Wireless Subscribers," filed Nov. 8, 2006, U.S. Appl. No. 11/557,939.
Barnes, James D., et al., entitled, "Advertisement Inventory Management," filed Oct. 27, 2008, U.S. Appl. No. 12/259,187.
Martin, Geoff S., et al., entitled, "Method and System for Providing Custom Background-Downloads," filed Nov. 16, 2007, U.S. Appl. No. 11/280,576.
McConnell, Von K. et al., entitled, "Method and System Using Location History for Targeted Coupon Distribution," filed May 17, 2000, U.S. Appl. No. 09/572,282.

Weaver, Farni, et al., "Method and System for Facilitating Determination of Call-Drop Locations in a Wireless Network," filed Sep. 9, 2003, U.S. Appl. No. 10/658,353.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H., et al., entitled "System and Method to Generate an Abstract Advertisement Campaign Management and Implement Policy Enforcement," filed Sep. 11, 2013, U.S. Appl. No. 14/024,629.
Burcham, Robert H., et al., entitled "System and Method to Generate an Abstract Advertisement Campaign Management and Implement Policy Enforcement," filed Sep. 10, 2014, PCT Application Serial No. PCT/US2014/054877.
Burcham, Robert H., et al., entitled "Methods and Systems of Generating a Unique Mobile Device Identifier," filed Aug. 1, 2013, U.S. Appl. No. 13/956,367.
Belser, John E., et al., entitled "Ad Management Using Ads Cached on a Mobile Electronic Device," filed Jan. 9, 2014, U.S. Appl. No. 14/150,832.
Katzer, Robin D., et al., entitled "Advertisement Dynamic Queue Management," filed Apr. 10, 2014, U.S. Appl. No. 14/250,381.
Burcham, Robert H., et al., entitled "Categorization of Unknown Variables in a Target Information Database," filed Nov. 4, 2014, U.S. Appl. No. 14/532,969.
Final Office Action dated May 3, 2016, U.S. Appl. No. 11/557,939, filed Nov. 8, 2006.
Restriction Requirement dated May 19, 2016, U.S. Appl. No. 14/024,627, filed Sep. 11, 2013.
Office Action dated May 17, 2016, U.S. Appl. No. 14/150,832, filed Jan. 9, 2014.
First Action Interview Office Action dated Apr. 28, 2016, U.S. Appl. No. 14/245,822, filed Apr. 4, 2014.
Office Action dated Jul. 1, 2016, U.S. Appl. No. 14/165,569, filed Jan. 27, 2014.
Office Action dated Jul. 14, 2016, U.S. Appl. No. 14/165,571, filed Jan. 27, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Burcham, Robert H., et al., entitled "Swipe Screen Advertisement Metrics and Tracking," filed Nov. 27, 2013, U.S. Appl. No. 61/910,001.
Burcham, Robert H., et al., entitled "Swipe Screen Advertisement Metrics and Tracking," filed Jan. 27, 2014, U.S. Appl. No. 14/165,569.
Delker, Jason R., et al., entitled "Ad Management Using Ads Cached on a Mobile Electronic Device," filed Nov. 27, 2013, U.S. Appl. No. 61/910,002.
Delker, Jason R., et al., entitled "Ad Management Using Ads Cached on a Mobile Electronic Device," filed on Jan. 27, 2014, U.S. Appl. No. 14/165,571.
Notice of Allowance dated Jan. 28, 2016, U.S. Appl. No. 14/024,629, filed Sep. 11, 2013.
FAIPP Pre-Interview Communication dated Feb. 16, 2016, U.S. Appl. No. 14/245,822, filed Apr. 4, 2014.
Foreign Communication from a Related Counterpart—Preliminary Report on Patentability dated Mar. 24, 2016, PCT/US14/54877, filed on Sep. 10, 2014.
Hannebaum, Ryan K., et al., entitled, "Advertisement Campaign Target Selection Engine," filed Apr. 4, 2014, U.S. Appl. No. 14/245,822.
Office Action dated Aug. 24, 2016, U.S. Appl. No. 14/160,196, filed Jan. 21, 2014.
FAIPP Pre-Interview Communication dated Aug. 4, 2016, U.S. Appl. No. 14/160,206, filed Jan. 21, 2014.
FAIPP Office Action dated Oct. 21, 2016, U.S. Appl. No. 14/160,206, filed Jan. 21, 2014.
FAIPP Pre-Interview Communication dated Aug. 25, 2016, U.S. Appl. No. 14/160,215, filed Jan. 21, 2014.
FAIPP Office Action dated Oct. 21, 2016, U.S. Appl. No. 14/160,215, filed Jan. 21, 2014.
FAIPP Pre-Interview Communication dated Sep. 19, 2016, U.S. Appl. No. 14/160,224, filed Jan. 21, 2014.

(56) References Cited

OTHER PUBLICATIONS

FAIPP Office Action dated Oct. 21, 2016, U.S. Appl. No. 14/160,224, filed Jan. 21, 2014.
Final Office Action dated May 11, 2017, U.S. Appl. No. 14/160,196, filed Jan. 21, 2014.
Final Office Action dated Mar. 24, 2017, U.S. Appl. No. 14/160,206, filed Jan. 21, 2014.
Final Office Action dated May 4, 2017, U.S. Appl. No. 14/160,215, filed Jan. 21, 2014.
Final Office Action dated May 5, 2017, U.S. Appl. No. 14/160,224, filed Jan. 21, 2014.
Final Office Action dated Feb. 24, 2017, U.S. Appl. No. 14/160,196, filed Jan. 21, 2014.
FAIPP Pre-Interview Communication dated , U.S. Appl. No. 14/518,504, filed Oct. 20, 2014.
Advisory Action dated Jul. 26, 2017, U.S. Appl. No. 14/160,196, filed Jan. 21, 2014.
Notice of Allowance dated Jul. 26, 2017, U.S. Appl. No. 14/160,206, filed Jan. 21, 2014.
Advisory Action dated Jul. 26, 2017, U.S. Appl. No. 14/160,215, filed Jan. 21, 2014.
Advisory Action dated Jul. 26, 2017, U.S. Appl. No. 14/160,224, filed Jan. 21, 2014.
Notice of Allowance dated Jul. 10, 2017, U.S. Appl. No. 14/518,504, filed Oct. 20, 2014.
Notice of Allowance dated Feb. 2, 2018, U.S. Appl. No. 14/160,224, filed Jan. 21, 2014.
Notice of Allowance dated May 8, 2018, U.S. Appl. No. 14/160,196, filed Jan. 21, 2014.
Notice of Allowance dated Mar. 13, 2018, U.S. Appl. No. 14/160,215, filed Jan. 21, 2014.

\* cited by examiner

(12) United States Patent
US 10,405,173 B1

METHOD AND SYSTEMS OF COLLECTING AND SEGMENTING DEVICE SENSOR DATA WHILE IN TRANSIT VIA A NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Tracking mobile devices may be used to generate marketing and/or product information about a user of a mobile device. Businesses and/or advertisers may use the marketing and/or product information to advertise products to the particular user. As mobile device functionality increases, business and/or advertisers may better target particular customers based on their mobile device usage.

SUMMARY

A network system for collecting and segmenting device sensor data is disclosed. The system comprises a memory. The system further comprises a classification application configured to classify a subscriber profile based on at least one interaction record. The system also comprises a gateway configured to receive a first message from a mobile device comprising a user identification based on one or more mobile device specific values and a first interaction record based on a detection of an interaction between a first mobile device user and the mobile device, assign a subscriber profile with the first message, wherein the subscriber profile is based at least on the user identification, add at least the first interaction record to the assigned subscriber profile, and transmit the subscriber profile to the classification application.

A method of profiling mobile device users is disclosed. The method comprises identifying, by a network system, a first message from a mobile device to a first application, wherein the first message comprises a user identification based on one or more mobile device specific values and a first interaction record based on a detection of an interaction between a first mobile device user and the mobile device. The method further comprises receiving, by a gateway of the network system, the first message, wherein the gateway assigns a subscriber profile with the first message, wherein the subscriber profile is based at least on the user identification. The method also comprises adding, by the gateway of the network system, at least the first interaction record to the assigned subscriber profile. The method comprises transmitting, by the gateway of the network system, the subscriber profile to a classification application of the network system, wherein the classification application classifies the subscriber profile based at least on the first interaction record.

A method of profiling mobile device users is disclosed. The method comprises identifying, by a network system, a first message from a first mobile device to access a first application, wherein the first message comprises a first user identification based on one or more first mobile device specific values and at least one interaction record based on a detection of at least one interaction between a first mobile device user and the first mobile device, wherein the first user identification is associated with a mobile device owner. The method further comprises receiving, by a component of the network system, the first message to the first application. The method also comprises identifying, by the component of the network system, the first user identification and assigning a network identification to the first message based on the association between the first user identification and the mobile device owner, wherein the network identification comprises profile data of the mobile device owner. The method comprises receiving, by a gateway of the network system, the first message, wherein the gateway assigns the first message to a subscriber profile based on the network identification. The method further comprises adding, by the gateway of the network system, at least the interaction record to the subscriber profile. The method also comprises transmitting, by the gateway of the network system, the subscriber profile to a classification application of the network system, wherein the classification application classifies the subscriber profile based at least on the profile data of the mobile device owner and the interaction record based on the detection of the at least one interaction between the first mobile device user and the first mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
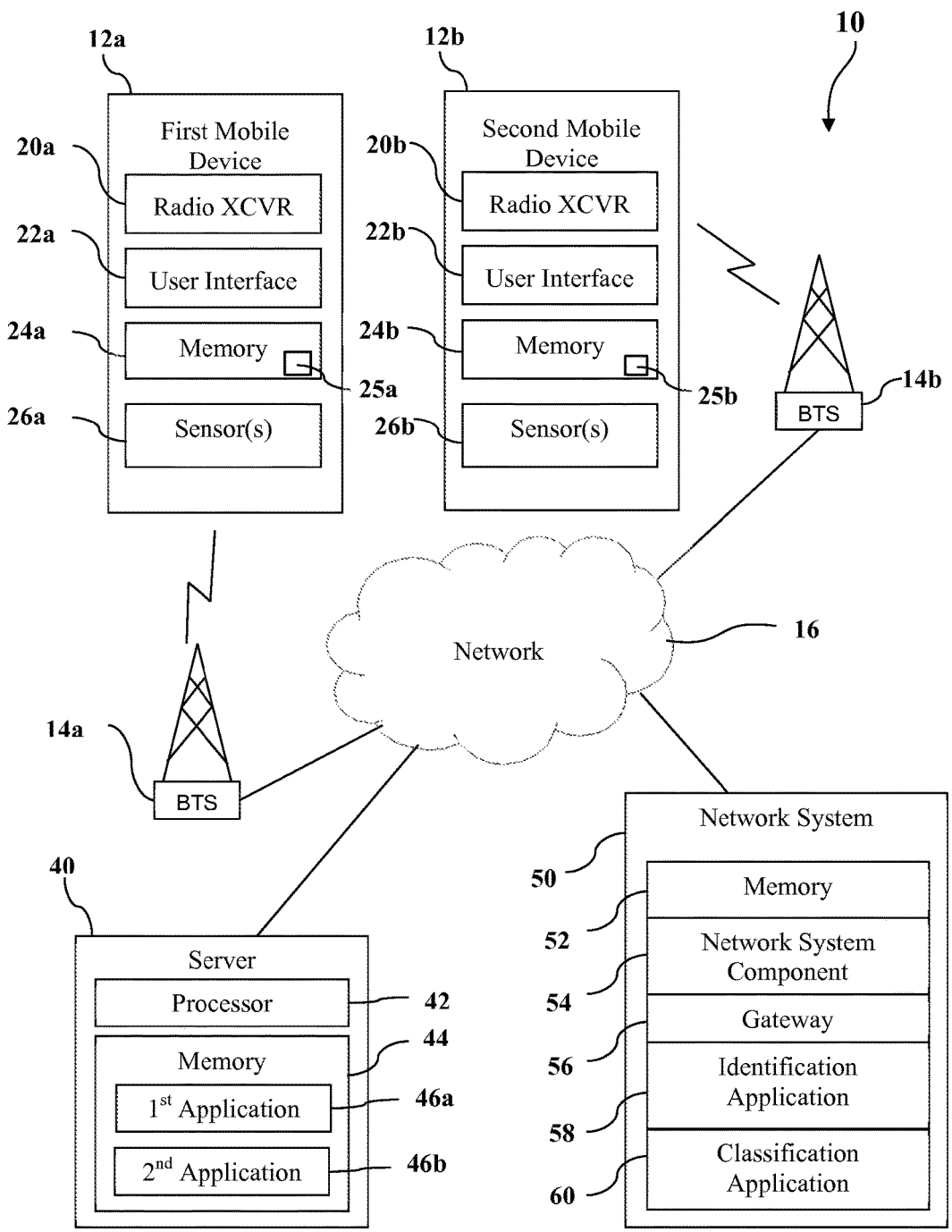
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a network system for profiling mobile device users. Mobile devices may be configured with a plurality of sensors for measuring interactions between a mobile device user and a mobile device. Sensors may comprise three-dimensional accelerometers, magnetic field sensors, GPS sensors, trilateration sensors, and/or any type of sensor by which human interaction with a mobile device can be derived. Interactions may comprise local physical interactions such as locations where a mobile device is stored when the user is not using the mobile device, but in transport with the mobile device, spatial orientation of the mobile device, movement of the mobile device, behavioral patterns of a mobile device user, and/or the like. Interactions may also comprise geographical interactions such as a particular route which the mobile device user drives every day or routinely, geographic locations the mobile device has been (e.g. one or more counties in a state, one or more states, one or more countries, one or more geographic bodies such as a particular mountain range or a particular body of water, and/or the like), one or more stores that a mobile device user frequents, and/or the like.

Interactions may also comprise mobile device user interactions such as the types of message(s) transmitted from and/or to the mobile device, the entities the mobile device is in communication with (e.g. communications by way of sending data messages, text messages, phone calls, website access, and/or the like), frequency of use of the mobile device and/or one or more particular mobile device features, the type of mobile device used, the time of the interaction and/or the mobile device use, the number and/or the type of applications purchased and/or used through the mobile device, how the mobile device user uses the mobile device (e.g. via Bluetooth, directed interaction with the user interface, a head set and microphone, and/or the like), the type of multimedia accessed by the mobile device (e.g. horror movies, country music, logic games, social interaction applications such as Facebook or twitter, nonfiction books, and/or the like), the use of a mobile wallet determining the type of goods and/or services which have been purchased and/or are frequently purchased, where they are purchased, how many are purchased at any one time, if they were purchased on sale, if they were purchased in conjunction with one or more other items, and/or the like.

These interactions may be retrieved and processed using one or more sensors to precisely classify mobile device users based on their particular interactions with their mobile devices. For example, an accelerometer may have sensed that a runner's mobile device was continuously moving up and down as well as continuously moving forward for a 45 minute duration. However, while this movement alone may indicate that the mobile device user was running, it may also indicate that the mobile device user was in an automobile moving on an uneven road. Thus, the mobile device may utilize trilateration and/or GPS to sense additional interactions so that a network system may associate the interactions accurately, for example by associating the sensed interactions with a common duration and/or period of time. For example, by utilizing trilateration and/or GPS, in addition to the accelerometer, and providing a time duration and/or time period associated with each sensed interaction, the mobile device may transmit a plurality of interaction records to a network system so that the network system may identify the velocity at which the runner was moving, whether she was moving on paved roads verses trails, and/or if the continuous forward movement began at her house and ended at her house within the same period and/or duration of time in order to rule out the possibility that she was in an automobile and determine she was running. Furthermore, the trilateration technology may have determined that the runner ran at a particular pace for the 45 minute duration. The network system may identify that pace and classify the runner as a moderate runner. Additionally, the GPS sensors may have also determined that the runner was located on a particular beach, such as Virginia Beach.

By precisely classifying individual mobile device users, specific interests may be identified for each mobile device user so that targeted information may be provided to the mobile device user via their mobile device. For example, by classifying the runner as a moderate runner, the runner may be informed of a specific type of running shoe made for moderate runners. Furthermore, the moderate runner may be clustered with other moderate runners. As another example, using the GPS sensor the runner may be classified as living close to a beach. The runner may be informed of running groups who run together at the particular beach she was running on. It should be understood that classifying may comprise arranging and/or organizing one or more entities according to a class or category, while clustering may comprise gathering one or more entities based on the one or more entities' classification(s), such as one or more common classification(s) or base on one or more inference(s).

In an embodiment, clustering may provide a way to identify an interest of a first mobile device without detecting a behavior by the first mobile device. For example, two mobile device users may each be classified as moderate runners. A first mobile device user may have used her electronic wallet to buy a health bar. Conversely, the second mobile device user may not have ever used his electronic wallet to buy any health bars and thus the network system may determine that the second mobile device user has never purchased any health bars. A network system may provide information such as advertisements, recommendations, coupons, news articles, promotions, and/or the like to inform the second mobile device user of the latest health bars and/or encourage the second mobile device user to purchase a health bar based on the moderate runner classification for both the first mobile device user and the second mobile device user as well as by identifying that the first mobile device user has purchased a health bar. Thus, by examining behaviors in this manner, information may be provided to mobile device(s) based on at least one similar classification and a unique behavior of one other mobile device user.

Furthermore, the network system may also cluster mobile devices classified as a mobile device used and/or owned by a moderate runner with other mobile devices used and/or owned by moderate runners to mass target messages, coupons, advertisements, recommendations, and/or the like to a group of mobile devices 12 which may be used and/or owned by moderate runners. For example, a running enthusiast located close to Virginia Beach may want to start a Virginia Beach running club for moderate runners. The running enthusiast may want to cluster all moderate runners and then identify of those moderate runners, which moderate runners run on and/or live close to Virginia Beach. The running enthusiast may be able to identify the moderate runner previously mentioned as well as other similar mobile device users to inform them of the new running club.

Turning now to FIG. 1, a communication system 10 is described. The communication system 10 may comprise a first mobile device 12a and/or a second mobile device 12b, base transceiver station(s) (BTS) 14a and/or 14b, a network 16, a server 40, and a network system 50. In an embodiment, the network system 50 may be configured to profile mobile devices users based on interactions between mobile device users and mobile devices, such as the first mobile device 12a and/or the second mobile device 12b. For example, the network system 50 may be configured to profile a mobile device user based on at least one of the type of message, the destination of the first message, spatial orientation of the mobile device, movement of the mobile device, frequency of use of the mobile device, type of mobile device use, or time of the interaction. In an embodiment, the communication system 10 may further comprise two or more network systems 50. For example, a first network system may profile mobile users sending requests to the first application 46*a*, while a second network system may profile mobile users sending requests to the second application 46*b*. In an embodiment, multiple network systems may communicate with each other to classify mobile device users.

The server 40 may comprise a processor 42, a memory 44, and a plurality of applications, such as the first application 46*a* and the second application 46*b*. The applications 46 may be configured to receive and send data messages to and/or from a mobile device and/or a computer terminal as is well known in the art. The server 40 may also comprise a plurality of processors located in a plurality of computers. Computers are discussed in more detail hereinafter.

The first mobile device 12*a* and/or the second mobile device 12*b* may be a mobile phone, a personal digital assistant (PDA), a media player, or other communication enabled portable electronic device. In an embodiment, the first mobile device 12*a* and/or the second mobile device 12*b* may be implemented as a handset. Details of handsets are discussed further hereinafter. The base transceiver stations 14*a* and 14*b* provide a communication link to the first mobile device 12*a* and/or the second mobile device 12*b*. For example, as shown in FIG. 1, the base transceiver station 14*a* couples the first mobile device 12*a* to the network 16, while the base transceiver station 14*b* couples the second mobile device 12*b* to the network 16. The base transceiver stations 14*a* and 14*b* may each couple both the first mobile device 12*a* and the second mobile device 12*b* to the network 16. In an embodiment, the base transceiver stations 14*a* and 14*b* provide wireless communication links to the first mobile device 12*a* and/or the second mobile device 12*b* according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While two base transceiver stations 14*a* and 14*b* are illustrated in FIG. 1, it is understood that the communication system 10 may comprise two or more base transceiver stations 14 and any number of mobile devices 12. The network 16 may be a public communication network, a private communication network, or a combination thereof.

The first mobile device 12*a* may comprise a radio transceiver 20*a*, a user interface 22*a*, and a memory 24*a*. Alternatively, the first mobile device 12*a* may comprise two or more radio transceivers 20*a*. Furthermore, the second mobile device 12*b* may comprise a radio transceiver 20*b*, a user interface 22*b*, and a memory 24*b*. Alternatively, the second mobile device 12*b* may comprise two or more radio transceivers 20*b*. In an embodiment, the memory 24*a* and/or the memory 24*b* may each store one or more data package(s) and/or applications 25*a* and 25*b*. The applications 25*a* and 25*b* may be associated with a network (e.g. Sprint) providing the network system 50 to be discussed further herein. Each application 25*a* and 25*b* may have been created using a software development kit. By creating an application using the software development kit and installing the application(s) on a mobile device 12, application(s) may provide a user identification identifying the particular mobile device that may be embedded in a message transmitted from the mobile device to an application on a server such as applications 46*a* and/or 46*b*. Messages may comprise a request to access a server and/or an application on a server, a transmission of data to and/or from a server, a verification and/or authentication to provide access to a secure server, and/or the like. The software development kit may be used to create application(s) that attach a marker to each transmitted message so that a network system 50 may identify a message as comprising a user identification and/or at least interaction record, also to be further discussed herein.

The first mobile device 12*a* may also comprise one or more sensor(s) 26*a* while the second mobile device 12*b* may comprise one or more sensor(s) 26*b*. The sensor(s) 26*a* and the sensor(s) 26*b* may comprise at least one of an accelerometer, one or more near field communication sensor(s), one or more sensor(s) communicating with the mobile device for example, via a wireless communications protocol such as Bluetooth® and/or Zigbee®, a rate sensor such as a gyroscope, and/or the like. The sensor(s) 26*a* and the sensor(s) 26*b* may also comprise one or more sensor(s) configured to detected, communicate with, and/or receive information from a radio frequency (RF) transceiver, a global positioning system (GPS) receiver, an analog baseband processing unit, a removable memory card, a universal serial bus (USB) port, an infrared port, a vibrator, a keypad, a touch screen liquid crystal display (LCD) with a touch sensitive surface, a touch screen/LCD controller, a camera, and/or the like installed in the first mobile device 12*a* and/or the second mobile device 12*b*.

The sensor(s) 26*a* and/or the sensor(s) 26*b* may be used to detect interactions between a mobile device user and the first mobile device 12*a* and/or the second mobile device 12*b*. For example, a sensor 26*a* may detect frequent use of a keypad on the first mobile device 12*a*, that a mobile device user prefers to access one or more services through an application instead of through a browser, that the mobile device user frequents particular geographic locations and/or stores (i.e. a type of spatial orientation of the mobile device), that the mobile device user travels a particular route and/or at a particular time to one or more geographic locations and/or stores (i.e. a type of movement of mobile device), that a mobile device user exclusively uses an electronic wallet installed on the mobile device at particular times (i.e. a type of frequency of use), for purchasing at particular stores (i.e. a type of mobile device use), and/or for purchasing particular products and/or services, that the mobile device user holds the mobile device in the morning and/or evening but stores the mobile device in a pocket during the day (i.e. another type of spatial orientation of the mobile device), that the mobile device user utilizes WiFi at a particular time and/or with one or more particular applications, but utilizes mobile broadband access at another time and/or with one or more other applications, and/or the like.

In an embodiment, the sensor 26*a* may be a remote sensor located away from the mobile device 12*a* and/or 12*b*. The mobile devices 12*a* and/or 12*b* may be linked wirelessly or by a physical wire to a remote sensor 26*a* for example to measure body temperature, blood pressure, a heart rate, inside and/or outside humidity, wind speed, tire pressure, and/or the like. The data collected by the sensor(s) may then be processed by a processing unit on the mobile device and assigned one or more interaction records based on one or more particular interactions.

The first mobile device 12a and/or the second mobile device 12b may store, for example, in the memory 24a and/or the memory 24b, a plurality of interaction records which may be used to identify one or more sensed interactions. The mobile device may attach one or more interaction reports to one or more message(s) (e.g. a request message to access an application located on a server) which are transmitted through the network 16 to an application, such as application(s) 46a and/or 46b, on a server 40 in communication with the network 16. In an embodiment, interaction records may be attached to and/or embedded in the next message transmitted by the mobile device 12. Alternatively, interaction records may accumulate until a predetermined number have accumulated so that a set of interaction records may be sent together with one message. In an embodiment, interaction records may accumulate in the memory of the mobile device 12 until off-peak-hours occur in order to reduce the load on the network during the peak usage hours. In an embodiment, the sensor(s) 26a and/or 26b may detect one or more message(s) being sent by the mobile device 12 to an application and attach an interaction records identifying the one or more characteristics of the message. In an embodiment, the mobile device 12 may attach the interaction records identifying the message with the message being sent and/or may attach the interaction records identifying the message to a subsequent message to be sent.

In addition to sending interaction records, the first mobile device 12a and/or the second mobile device 12b may also attach user identifications with the interaction records to one or more messages. User identifications are used to identify a user based on their mobile device, for example, via one or more user specific values. For example, a user identification may comprise a unique identification associated with only the first mobile device 12a, a classification of the first mobile device 12a (e.g. a smart phone versus a non-smart phone), the type of technology stack the mobile device 12 utilizes (e.g. iOS versus Android, in-application use versus in-browser use), and/or the like. Generally, the user identifications may not comprise the actual name and/or identification of the owner and/or user of the mobile device 12.

A user identification may be given to a mobile device 12 when an application comprising a software development kit is installed on the mobile device 12. For example, a mobile device utilizing the AT&T network may have downloaded a Sprint electronic wallet application (developed and/or created by a software development kit) because the user/owner for example enjoys the particular features provided by Sprint's electronic wallet application. Alternatively, a Sprint mobile device and/or a mobile device 12 configured to utilize the Sprint network may have a software development kit stored on the mobile device 12 and/or one or more applications installed on the mobile device 12. The software development kit may provide a user identification identifying the particular mobile device 12. User identifications may be attached to an individual interaction record and/or a user identification may be attached to a set of interaction records.

In addition to providing user identifications for mobile devices, the application(s) created by software development kits and stored on a mobile device 12 may also be configured transmit a marker attached to and/or embedded with each message transmitted, for example, to permitting interaction between message(s) and the network system 50 before the message(s) move on to an application on a server 40 in communication with the network. Alternatively, the marker may function as a beacon so that an identification application 58 of the network system 50, a network system component 54 of the network system 50, and/or a gateway 56 of the network system 50 may identify, intercept and/or receive the message.

For example, a mobile device 12 may have an application comprising a software development kit stored with it. The mobile device user may have been carrying her mobile device while she went for a 45 minute run. Her mobile device, similar to the first mobile device 12a and/or the second mobile device 12b, may have sensed a continuous up and down motion as well as a continuous forward motion for a 45 minute time duration sensed by the mobile device's three-dimensional accelerometer. Her mobile device may associate one or more interaction record(s) with the continuous up and down motion for 45 minutes over a period of time (e.g. from 5:30 am to 6:15 am on Friday Apr. 19, 2013) and may attach the interaction record(s) as well as a user identification to a message to be sent to an application, such as the first application 46a on the server 40 located in the network 16. Additionally, the using the GPS sensor, the mobile device may determine that the runner runs on Virginia Beach. As will be discussed further herein, a network system 50 may receive and/or intercept the message by way of the marker to obtain the interaction record(s) and the user identification sent via the message from the runner's mobile device and classify the mobile device based on the interaction record(s) and the user identification.

In an embodiment, the mobile device 12 may utilize multiple different sensors to identify a plurality of interaction records for mobile device classification. For example, a three-dimensional accelerometer may sense that the runner's mobile device is continuously moving up and down as well as continuously moving forward for the 45 minute duration. However, while this movement alone may indicate that the mobile device user was running, it may also indicate that the mobile device user was in an automobile moving on an uneven road. Thus, the mobile device 12 may utilize trilateration and/or GPS to sense additional interactions so that a network system 50 may associate the interactions accurately, for example by associating the sensed interactions with a common duration and/or period of time. For example, by utilizing trilateration and/or GPS, in addition to the three-dimensional accelerometer, and providing a time duration and/or time period associated with each sensed interaction, the mobile device 12 may transmit a plurality of interaction records to a network system 50 so that the network system 50 may determine the velocity at which the runner was moving, whether she was moving on paved roads verses trails, and/or if the continuous forward movement began at her house and ended at her house within the same period and/or duration of time in order to rule out the possibility that she was in an automobile and precisely identify that she was running.

The communication system 10 may also comprise a network system 50. The network system 50 may comprise a memory 52, a network system component 54, a gateway 56, an identification application 58, and a classification application 60 (which may be referred to collectively as the "elements of the network system 50"). It should be understood that while the elements of the network system 50 are depicted together, each of the elements of the network system 50 may located independently of each other, for example, on one or more individualized servers comprising a processor and memory, while in communication through the network 16. Alternatively, in an embodiment, two or more elements of the network system 50 may reside together on a single server comprising a processor and a memory while in communication with the network 16. The network system server 50 may be configured to profile mobile device users and/or owners based on interactions between mobile device users and/or owners and mobile devices 12. For example, based on the sensing of an up and down motion as well as a continuous forward motion sensed by the three-dimensional accelerometer of the mobile device 12, sensing the route and/or velocity of the mobile device user utilizing trilateration and/or the GPS of the mobile device 12, along with a record of how long the interactions lasted (e.g. 45 minutes), the network system 50 may classify the owner and/or a user of the mobile device 12 as a moderate runner.

The moderate runner classification assigned to the mobile device 12 may be used to alert merchants, groups, providers of services and/or the like to target messages, coupons, advertisements, recommendations, and/or the like to the mobile device 12 which may be related to and/or of interest to moderate runners. For example, in combination with identifying that the runner runs on Virginia Beach, merchants and/or groups located on and/or near Virginia Beach may be able to provide advertisements and/or messages to the moderate runner. Furthermore, the network system 50 may also cluster mobile devices 12 classified as a mobile device used and/or owned by a moderate runner with other mobile devices 12 used and/or owned by moderate runners to mass target messages, coupons, advertisements, recommendations, and/or the like to a group of mobile devices 12 which may be used and/or owned by moderate runners. For example, a running enthusiast located close to Virginia Beach may want to start a Virginia Beach running club for moderate runners. The running enthusiast may want to cluster all moderate runners and then identify of those moderate runners, which moderate runners run on and/or live close to Virginia Beach. The running enthusiast may be able to identify the moderate runner previously mentioned as well as other similar mobile device users to inform them of the new running club.

The identification application 58 may be configured to identify a message and/or a marker associated with one or more message(s) while the message is transmitted from a mobile device 12 through a network to an application located on a server in communication with the network 16, where the message comprises one or more interaction record(s) and/or a user identification attached to the message. For example, a marker permitting interaction between the message and the network system 50 and attached to a message from a mobile device 12 may move on to an application on a server 40 in communication with the network, for example, the first application 46*a* on the server 40. The identification application 58 may identify the message and/or the marker and alert the gateway 56 and/or the network system component 54 of the transmission of the message with one or more interaction record(s) and/or a user identification attach to it, so that the gateway 56 and/or the network system component 54 may receive and/or intercept the message and/or initiate their functions. In an embodiment, the identification application 58 may be an element of the gateway 56 and/or the network system component 54.

The network system component 54 may be configured to receive and/or intercept a message transmitted from a mobile device 12 through a network 16 to an application located on a server in communication with the network 16. The network system component 54 may be configured to identify the user identification attached to a message and determine if a network identification exists that is associated with that user identification. Generally, a network identification may be associated with one or more mobile devices 12 that utilize (i.e. receives mobile services such as data, text, voice and/or the like) a network 16 which implements the network system 50. The network identification may be determined from the user identification accessing a look-up table and search the look-up table until a network identification with a matching user identification is found. The network identification may provide profile information about a mobile device 12 as well as owner/users of the mobile device(s) 12. For example, network identifications may identify one or more additional mobile devices 12 on the same account as the mobile device 12 transmitting the message, the location of the home of the owner and/or user of the mobile device 12, demographic information about the owner and/or user of the mobile device 12, and/or the like. If a network identification associated with the user identification is identified by the network system component 54, the network system component 54 may attach the network identification to the message (e.g. the HTTP header of the message) to provide additional data by which to more precisely classify and/or cluster the mobile device 12. Alternatively, if the network system component 54 does not identify a network identification associated with the user identification, the mobile device transmitting the message may be classified and/or clustered with less information and possibly with less precision.

The gateway 56 may be configured to receive a message from a mobile device 12 and assign a subscriber profile to the message. The subscriber profile may be based on a user identification attached to a message. For example, the network system component 54 may not find a network identification associated with the user identification attached to a message. The gateway 56 may receive the message and assign a subscriber profile based on the user identifications attached to the message. In an embodiment, the gateway 56 may access a memory such as a data store and compare the user identification attached to the message with a plurality of user identification associated with subscriber profiles. If the gateway 56 identifies a match between the user identification attached to the message and a user identification associated with a stored subscriber profile, the gateway 56 may generate a record of each interaction record of the message associated with the user identification and add those records to the subscriber profile. Additionally, the gateway 56 may store a record of one or more aspects of the user identification, such as whether the mobile device 12 is using iOS versus Android or whether a service is being accessed via an application versus a browser, which may also be used to classify subscriber profiles. Alternatively, if the gateway 56 does not identify a match between the user identification attached the message and a user identification associated with a stored subscriber profile, the gateway component 56 may generate a new subscriber profile associated with the user identification and store each provided interaction record associated with the user identification with the subscriber profile. Thus, when the same mobile device 12 sends a subsequent message with new interaction record(s), the gateway 56 will update the subscriber profile with the new interaction record(s) by identifying the subscriber profile using the user identification. The updated subscriber profile may be sent to the classification application 60 to reclassify the subscriber profile.

In an embodiment, the subscriber profile may be based on a network identification. For example, the network system component 54 may have found a network identification associated with the user identification attached to a message. The gateway 56 may receive the message and assign a subscriber profile based on the network identification attached to the message. In an embodiment, the gateway 56 may access a memory such as a data store and compare the network identification attached to the message with a plurality of network identifications associated with subscriber profiles. If the gateway 56 identifies a match between the network identification attached to the message and a network identification associated with a stored subscriber profile, the gateway component 56 may store and/or add each interaction record of the message associated with the network identification to the subscriber profile. Furthermore, the gateway 56 may obtain updated profile information from the network identification and store records of the updated profile information with the subscriber profile. Alternatively, if the gateway 56 does not identify a match between the network identification attached the message and a network identification associated with a stored subscriber profile, the gateway 56 may generate a new subscriber profile associated with the network identification and store each interaction record associated with the network identification with the subscriber profile. The gateway 56 may retrieve the profile data from a remote server based on the user identification. Thus, when the same mobile device 12 sends a subsequent message with new interaction record(s), the gateway 56 will update the subscriber profile with the new interaction record(s) by identifying the subscriber profile using the network identification. The updated subscriber profile may be sent to the classification application 60 to reclassify the subscriber profile.

Additionally, the gateway 56 may store a record of one or more aspects of the user identification, such as whether the mobile device 12 is using iOS versus Android or whether a service is being accessed via an application versus a browser, which may also be used to classify subscriber profiles. In an embodiment, if a user identification has been associated with a network identification, a subscriber profile with profile data may have been created when the network identification was created so that when the network identification is attached to a message for the first time, gateway 56 may not have to generate a record of profile data associated with the network identification.

The gateway 56 may also associate a second mobile device such as the second mobile device 12b with a first mobile device such as first mobile device 12a when the user identification associated with first mobile device 12a and the user identification associated with second mobile device 12b are associated with the same subscriber profile for example based on a common owner of both the first mobile device 12a and the second mobile device 12b. For example, an owner may own a first mobile device 12a as well as a second mobile device 12b which are both utilizing the same network 16. Because both the first mobile device 12a and the second mobile device 12b may utilize the network 16 associated with network system 50 (e.g. the Sprint network), a single network identification may be associated with both mobile devices 12. Furthermore, because each network identification comprises profile data including the owner of mobile device 12, the gateway 56 may recognize the common ownership for both the first mobile device 12a and the second mobile device 12b and assign a common subscriber profile to both the first mobile device 12a and the second mobile device 12b. Regardless of whether the gateway 56 generates and/or locates a subscriber profile based on the user identification and/or the network identification, it will be understood that once the user identification, the network identification, the interaction record, and/or the profile data are obtained from a message, the message may be transmitted forward to the application, such as first application 46a, that it was originally intended to be received by.

The classification application 60 may be configured to classify the subscriber profile based on at least interaction record and/or at least one element of profile information. Once the classification application 60 classifies a subscriber profile, the classification application 60 may cluster the subscriber profile with at least one other subscriber profile that shares at least one common classification. For example, with the runner, interaction records comprising continuously moving up and down as well as continuously moving forward for the 45 minute duration, the velocity by which the runner was moving, moving on trails, identifying that the continuous forward movement began at her house and ended at her house within the same period and/or duration of time, may be examined by the classification application 60 to classify the mobile device user and/or owner associated with mobile device as a moderate runner. The classification application 60 may then search a data base of subscriber profiles to locate at least one other subscriber profile that may have been classified as a moderate runner. The classification application 60 may then cluster the runner's subscriber profile with at least one other subscriber profile based on the moderate runner classification. The cluster of moderate runner subscriber profiles may then be sent to advertisers, marketers, merchants, service providers, manufacturers, media, and/or the like so that they may provide coupons, advertisements, promotional information, news, and/or the like related to running at a moderate level to the mobile devices associated with the clustered subscriber profiles.

In an embodiment, while the subscriber profile of the runner may have been classified as a moderate runner based on the above listed interaction records, the other subscriber profile may not have been classified as a moderate runner using the same interaction records. For example, the other subscriber profile may have been classified as a moderate runner by the type of running shoes that have been purchased and the frequency new running shoes are purchased. However, regardless of how the classification application 60 classifies subscriber profiles, in this example, subscriber profiles classified as moderate runners may still be clustered because they are classified as moderate runners.

In an embodiment, the classification application 60 may identify at least one of a similar interaction records between the subscriber profile and the at least one other subscriber profile, identifying at least one of another interaction records of the other subscriber profile which is different from any interaction records of the subscriber profile, and associating the subscriber profile with the different interaction records based on the similar interaction records. For example, as previously described the moderate runner subscriber profile may have been classified as a moderate runner profile based on continuously moving up and down as well as continuously moving forward for the 45 minute duration, the velocity at which the runner was moving, moving on trails, identifying that the continuous forward movement began at her house and ended at her house within the same period and/or duration of time. Furthermore another subscriber profile while not classified as moderate runner may have an interaction record of moving on trails. Additionally, the other subscriber profile may have stored an interaction record, for example through the user of an electronic wallet, of buying a particular energy bar, that the user and/or owner associated with the other subscriber profile frequently purchases. Conversely, the subscriber profile associated with the moderate runner may not have stored an interaction record of buying an energy bar. However, because the moderate runner subscriber profile and the other subscriber profile both have the interaction record of moving on trails stored with their subscriber profiles, the classification application 60 may determine that the moderate runner subscriber profile may also have a health food interest and provide advertisers, marketers, merchants, service providers, manufacturers, media, and/or the like to inform the moderate runner about health food and/or energy bars by provide coupons, advertisements, promotional information, news, and/or the like related to health food to the moderate runner's mobile device.

Figure 2:
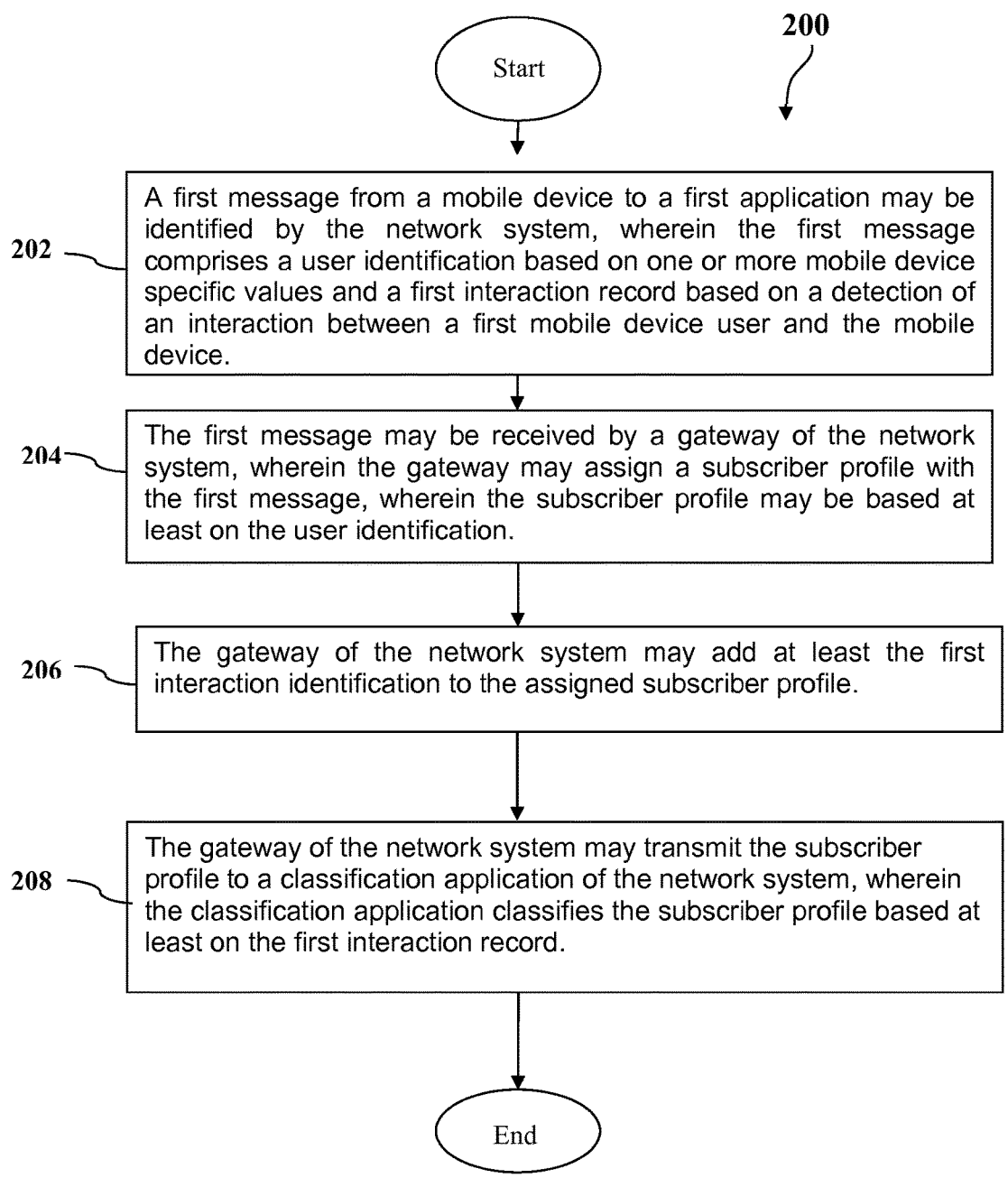
FIG. 2 is a flow chart of a method according to an embodiment of the disclosure.

In FIG. 2, a method 200 is described. At block 202, a first message from a mobile device to a first application 46a may be identified by the network system 50, wherein the first message comprises a user identification based on one or more mobile device 12 specific values and a first interaction record based on a detection of an interaction between a first mobile device user and the mobile device 12. In an embodiment, the first message may be identified by identifying a marker attached to the first message, wherein the marker is provided by a software development kit of an application installed on the first mobile device 12a. Furthermore, the device specific values may be based on at least one of the type of device or the application technology stack, as previously described herein. In an embodiment, the first interaction record identifies at least one of the type of message, the destination of the first message, spatial orientation of the mobile device, movement of the mobile device, frequency of use of the mobile device, type of mobile device use, or time of the interaction.

At block 204, the first message may be received by a gateway 56 of the network system 50, wherein the gateway 50 may assign a subscriber profile with the first message, wherein the subscriber profile may be based at least on the user identification. At block 206, the gateway 56 of the network system may add at least the first interaction record to the assigned subscriber profile.

At block 208, the gateway 56 of the network system 50 may transmit the subscriber profile to a classification application 60 of the network system 50, wherein the classification application classifies the subscriber profile based at least on the first interaction record.

The method 200 may further comprise that the classification application 60 of the network system 50 may cluster the subscriber profile with at least one other subscriber profile based at least on the first interaction record. The method 200 may also comprise that the network system 50 may identify a second message from the first mobile device 12a to a second application 46b, wherein the second message comprises the user identification and a second interaction record based on a detection of an interaction between a second mobile device user and the first mobile device 12a. In an embodiment, the second mobile device user may be the first mobile device user. The method 200 may also comprise that the gateway 56 of the network system 50 may receive the second message wherein the gateway 56 assigns the second message to the subscriber profile, wherein the subscriber profile comprises at least the at least one interaction record of the first message. The method 200 may further comprise that the gateway 56 of the network system 50 may add the at least one interaction record of the second message to the subscribe profile so that the subscriber profile comprises the at least one interaction record of the first message and the at least one interaction record of the second message and may transmit the subscriber profile to the classification application 60 of the network system 50 to reclassify the subscriber profile based on the addition of the at least one interaction record of the second message.

Figure 3:
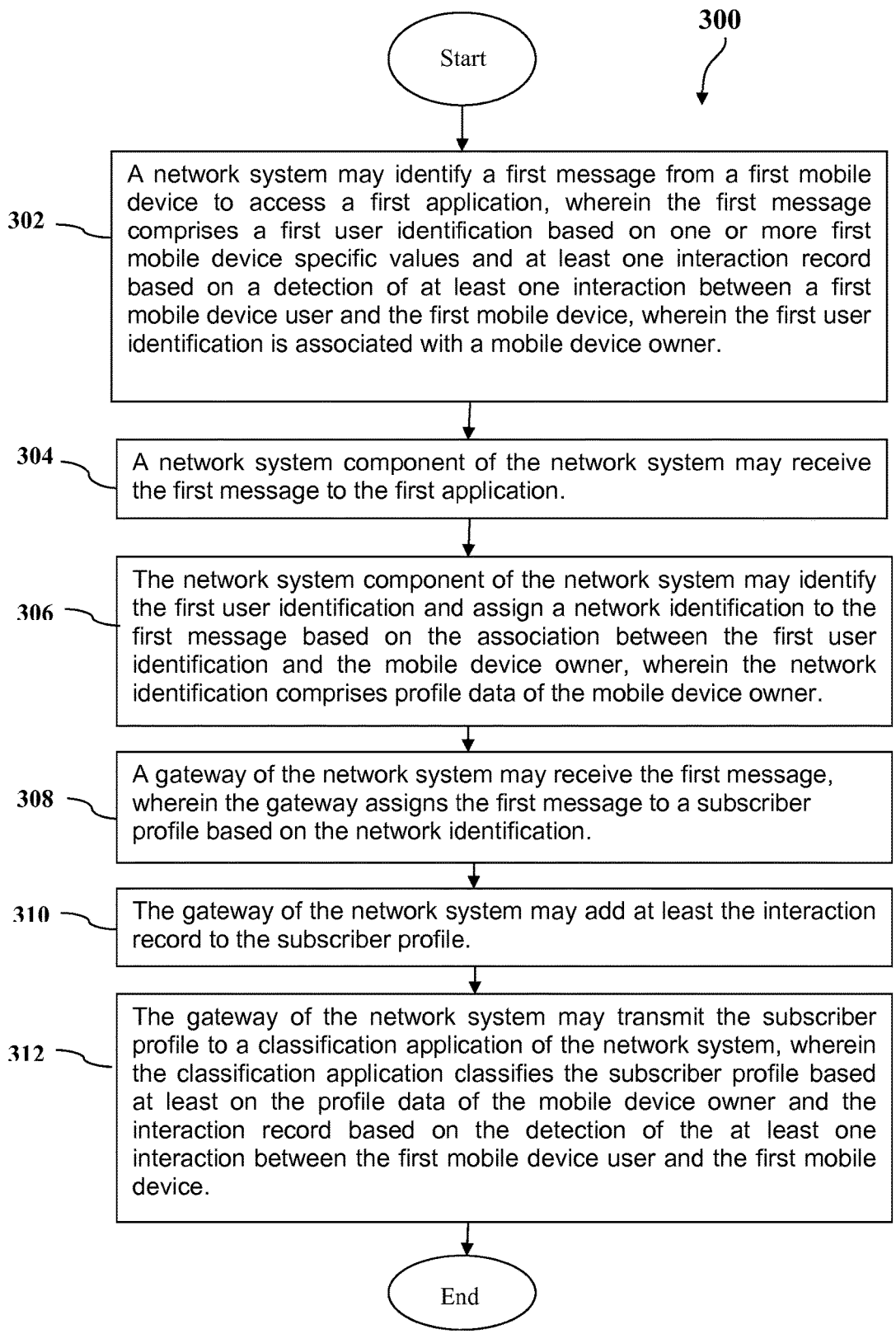
FIG. 3 is a flow chart of a method according to an embodiment of the disclosure.

In FIG. 3, a method 300 is described. At block 302, a network system 50 may identify a first message from a first mobile device 12a to access a first application, wherein the first message comprises a first user identification based on one or more first mobile device 12a specific values and at least one interaction record based on a detection of at least one interaction between a first mobile device user and the first mobile device 12a, wherein the first user identification is associated with a mobile device owner. At block 304, a network system component 54 of the network system 50 may receive the first message to the first application.

At block 306, the network system component 54 of the network system 50 may identify the first user identification and assign a network identification to the first message based on the association between the first user identification and the mobile device owner, wherein the network identification comprises profile data of the mobile device owner. In an embodiment, assigning may comprise matching the mobile device owner associated with the first user identification with a mobile device owner associated with the network identification.

At block 308, a gateway 56 of the network system 50 may receive the first message, wherein the gateway 56 assigns the first message to a subscriber profile based on the network identification. At block 310, the gateway 56 of the network system 50 may add at least the interaction record to the subscriber profile.

At block 312, the gateway 56 of the network system 50 may transmit the subscriber profile to a classification application of the network system, wherein the classification application 60 classifies the subscriber profile based at least on the profile data of the mobile device owner and the interaction record based on the detection of the at least one interaction between the first mobile device user and the first mobile device 12a.

The method 300 may further comprise that the classification application 60 of the network system 50 may cluster the subscriber profile with at least one other subscriber profile based on a similarity between the at least one interaction record of the first message and an interaction record associated with the other subscriber profile. In an embodiment, clustering may comprise identifying at least one of a similar interaction record between the subscriber profile and the at least one other subscriber profile, identifying at least one of another interaction record of the other subscriber profile which is different from any interaction record of the subscriber profile, and associating the subscriber profile with the different interaction record based on the similar interaction records.

The method 300 may also comprise that the network system 50 identifies a second message from a second mobile device 12b a second application 46b, wherein the second message comprises a second user identification based on one or more second mobile device specific values and at least one interaction record based on a detection of at least one interaction between a second mobile device user and the second mobile device 12b, wherein the second user identification is associated with the mobile device owner. The method 300 may further comprise that the network system component 54 of the network system 50 may receive the second message to the second application 46b, identify the second user identification, and assign the network identification to the second request based on the association between the second user identification and the mobile device owner. The method 300 may also comprise that the gateway 56 of the network system 50 may receive the second message, wherein the gateway assigns the second message to the subscriber profile based on the network identification, wherein the subscriber profile comprises at least the profile data of the mobile device owner and the at least one interaction record of the first message, add the at least one interaction record of the second message to the subscribe profile so that the subscriber profile comprises the profile data of the mobile device owner, the at least one interaction record of the first message, and the at least one interaction record of the second message, and transmit the subscriber profile to the classification application 60 of the network system 50 to reclassify the subscriber profile based on the addition of the at least one interaction record of the second message. In an embodiment, the method 300 may further comprise that the classification application 60 of the network system 50 may recluster the subscriber profile based on the reclassification of the subscriber profile.

Figure 4:
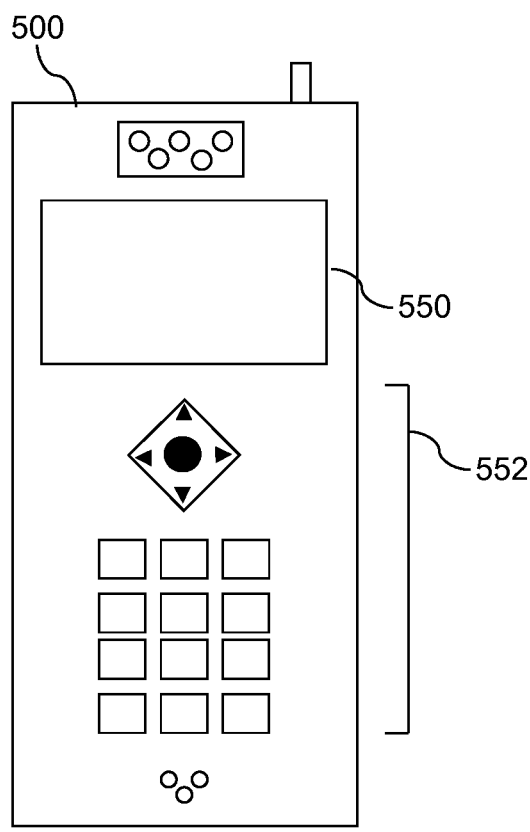
FIG. 4 is an illustration of a mobile device according to an embodiment of the disclosure.

FIG. 4 depicts the mobile device 500, which is operable for implementing aspects of the present disclosure, but the present disclosure should not be limited to these implementations. Though illustrated as a mobile phone, the mobile device 500 may take various forms including a wireless handset, a pager, a personal digital assistant (PDA), a gaming device, or a media player. The mobile device 500 includes a display 550 and a touch-sensitive surface and/or keys 552 for input by a user. The mobile device 500 may present options for the user to select, controls for the user to actuate, and/or cursors or other indicators for the user to direct. The mobile device 500 may further accept data entry from the user, including numbers to dial or various parameter values for configuring the operation of the handset. The mobile device 500 may further execute one or more software or firmware applications in response to user commands. These applications may configure the mobile device 500 to perform various customized functions in response to user interaction. Additionally, the mobile device 500 may be programmed and/or configured over-the-air, for example from a wireless base station, a wireless access point, or a peer mobile device 500. The mobile device 500 may execute a web browser application which enables the display 550 to show a web page. The web page may be obtained via wireless communications with a base transceiver station, a wireless network access node, a peer mobile device 500 or any other wireless communication network or system.

Figure 5:
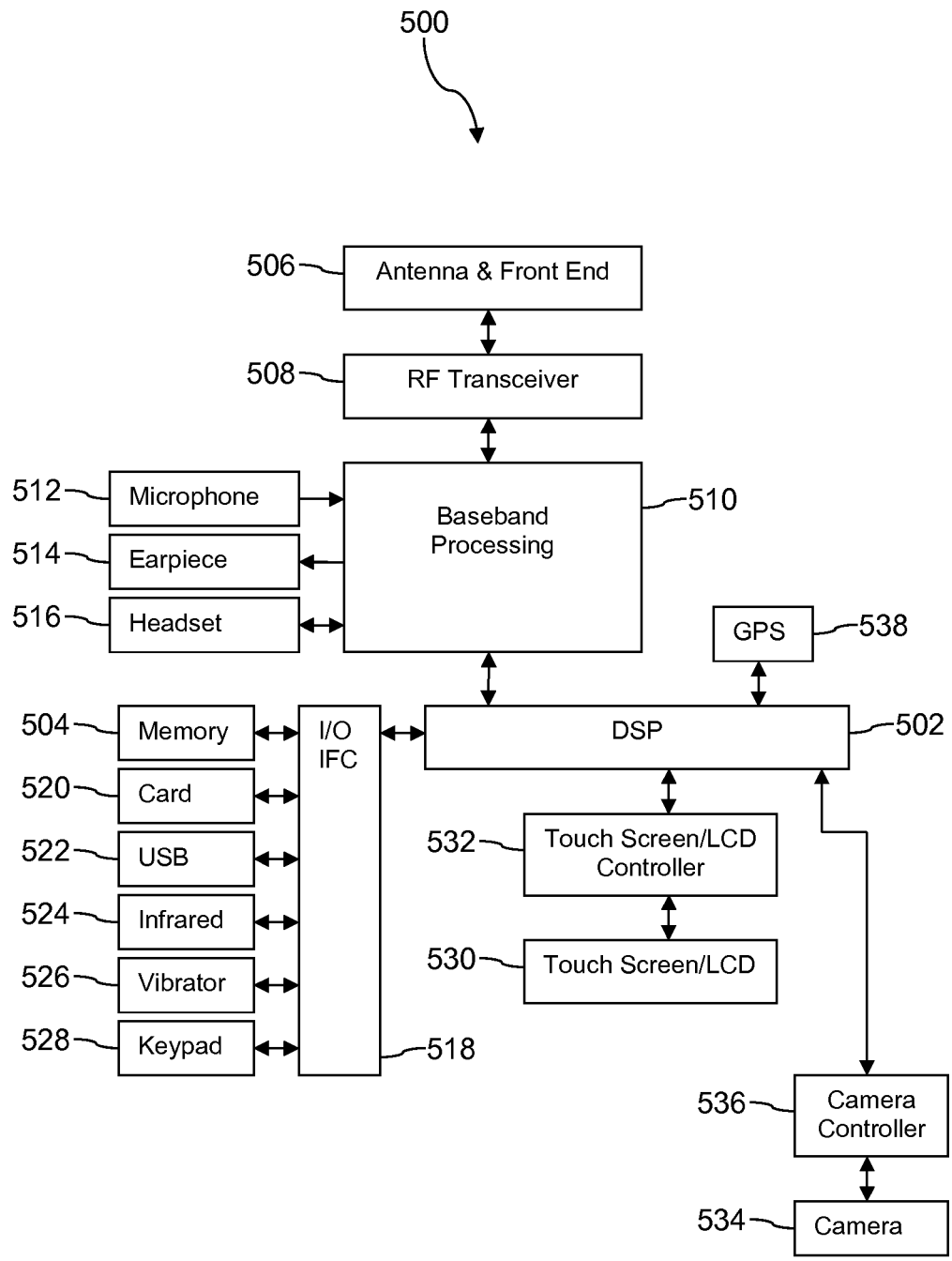
FIG. 5 is a block diagram of a mobile device according to an embodiment of the disclosure.

FIG. 5 shows a block diagram of the mobile device 500. While a variety of known components of handsets are depicted, in an embodiment a subset of the listed components and/or additional components not listed may be included in the mobile device 500. The mobile device 500 includes a digital signal processor (DSP) 502 and a memory 504. As shown, the mobile device 500 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 500 may include another kind of display that does not provide a touch sensitive screen. In an embodiment, the DSP 502 may communicate directly with the memory 504 without passing through the input/output interface 518. Additionally, in an embodiment, the mobile device 500 may comprise other peripheral devices that provide other functionality.

The DSP 502 or some other form of controller or central processing unit operates to control the various components of the mobile device 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 500 to function as a peripheral device to exchange information with a personal computer or other computer system. The infrared port 524 and other optional ports such as a Bluetooth interface or an IEEE 802.11 compliant wireless interface may enable the mobile device 500 to communicate wirelessly with other nearby handsets and/or wireless base stations.

The keypad 528 couples to the DSP 502 via the interface 518 to provide one mechanism for the user to make selections, enter information, and otherwise provide input to the mobile device 500. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 500 to determine its position.

Figure 6A:
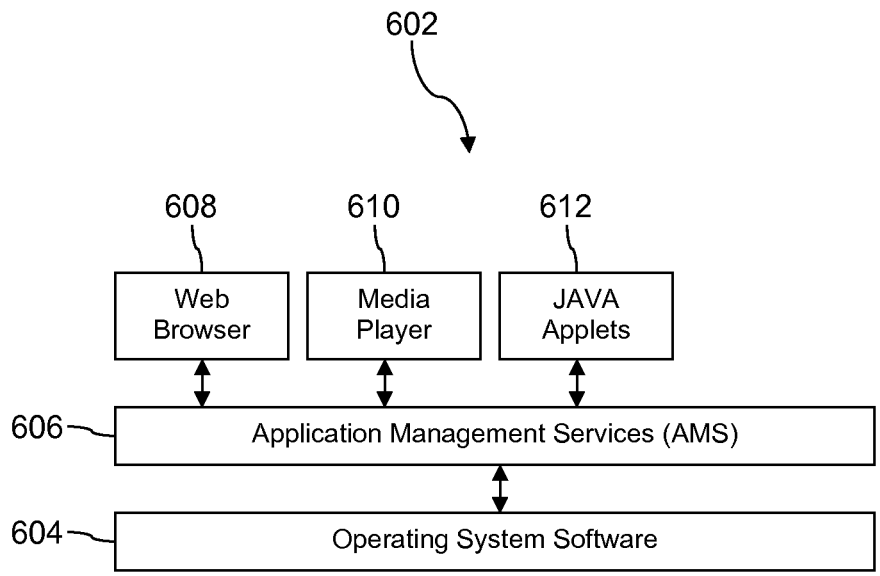
FIGS. 6A and 6B are block diagrams of software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 500. Also shown in FIG. 6A are a web browser application 608, a media player application 610, and JAVA applets 612. The web browser application 608 may be executed by the mobile device 500 to browse content and/or the Internet, for example when the mobile device 500 is coupled to a network via a wireless link. The web browser application 608 may permit a user to enter information into forms and select links to retrieve and view web pages. The media player application 610 may be executed by the mobile device 500 to play audio or audiovisual media. The JAVA applets 612 may be executed by the mobile device 500 to provide a variety of functionality including games, utilities, and other functionality.

Figure 6B:
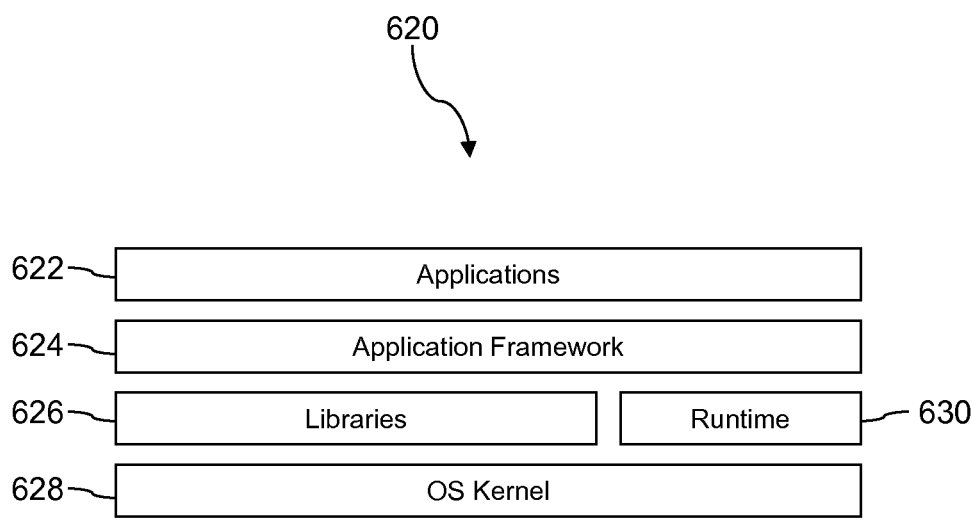

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
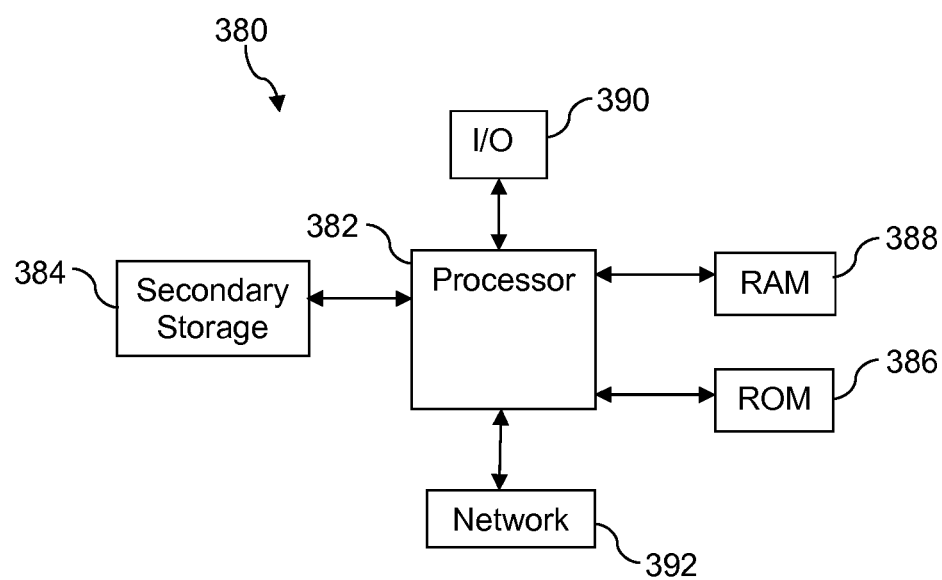
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A network system for collecting and segmenting device sensor data while in transit via a network, the network system comprising:
   a network system server having a processor and a non-transitory memory storing a network system component and a classification application stored in the non-transitory memory that configures the processor upon execution to classify a subscriber profile based on at least one interaction record; and
   a gateway that is communicatively coupled to the network, network system component, and classification application, and configured to:
      detect, by the gateway, a message being transmitted from a mobile device, through the network system, to an application located on a server, wherein the server comprising the application is connected to the network and the server is external to the network system, wherein the message is detected via a marker and the message comprises an interaction record and user identifier corresponding to the mobile device, the interaction record of the message comprising sensor data corresponding to interactions, measured via a plurality of sensors communicatively coupled to the mobile device, between a user of the mobile device and the mobile device, and wherein the sensor data corresponds to spatial orientation of the mobile device, movement of the mobile device, frequency of use of the mobile device, and type of mobile device use,
      in response to the detection of the marker, intercept, by the gateway, the message being transmitted through the network system and receive the message at the gateway before the message is forwarded to the application located on the server that is external to the network system,
      in response to the intercepted message being received at the gateway and before the message is forwarded to the server that is external to the network system:
         compare the user identifier to a data store comprising a plurality of user identifiers associated with subscriber profiles;
         assign, by the gateway when the user identifier matches a stored subscriber profile in the data store, the message to the stored subscriber profile based at least on one of the user identifier or a network identifier appended to a Hypertext Transfer Protocol (HTTP) header of the message by the network system component, generate and store, by the gateway when the user identifier does not match any stored subscriber profile in the data store, a new subscriber profile, assign, by the gateway, the message to the new subscriber profile based at least on one of the user identifier or the network identifier appended to the HTTP header of the message by the network system component, and add, by the gateway, at least the interaction record of the message to the assigned subscriber profile, transmit the assigned subscriber profile to the classification application that classifies the assigned subscriber profile and clusters the assigned subscriber profile with at least one other subscriber profile based on the classification, and forward, by the gateway, the message from the gateway to the application located on the server that is external to the network system, wherein the message has the network identifier appended to the HTTP header.

2. The system of claim 1, further comprising an identification application configured to identify the message so that at least the gateway may receive the message.

3. The system of claim 2, wherein the identification application identifies the message based on the marker, and wherein the marker is generated by a software development kit within an application on the mobile device.

4. The system of claim 1, wherein the network system component is configured to:

receive the message comprising the user identifier, wherein the user identifier is associated with a mobile device owner;

identify the user identifier and assign the network identifier to the message based on the association between the user identifier and the mobile device owner, wherein the network identifier comprise profile data of the mobile device owner; and transmit the message to the gateway, wherein the gateway assigns the subscriber profile based on the network identifier.

5. The system of claim 4, wherein the network identifier exists for the mobile device only if the mobile device utilizes services associated with the network providing the network system.

6. The system of claim 1, wherein the sensor data further comprises a time of the interaction.

7. The system of claim 1, wherein the classification application is configured to cluster the assigned subscriber profile with at least one other subscriber profile based on a common classification.

8. The system of claim 1, wherein the classification application notifies a computer system associated with at least one of a merchant, advertiser, marketer, service provider, or media outlet so that at least one of a coupon, an advertisement, a promotion, a recommendation, or update related to the classification of the assigned subscriber profile is sent via the network to the mobile device.

9. A method for collecting device sensor data while in transit via a network, the method comprising:

detecting, by a gateway within a network system, a message being transmitted on the network from a mobile device, through the network system, to an application located on a server, wherein the server comprising the application is connected to the network and the server is external to the network system, wherein the message is detected via a marker and the message comprises: a user identifier based on one or more mobile device specific values, and an interaction record having sensor data corresponding to interactions, measured via a plurality of sensors communicatively coupled to the mobile device, between a mobile device user and the mobile device, and wherein the sensor data corresponds to spatial orientation of the mobile device, movement of the mobile device, frequency of use of the mobile device, and type of mobile device use;

in response to detecting the message, intercepting, by the gateway of the network system, the message being transmitted through the network system and receiving the message at the gateway before the message is forwarded to the application located on the server that is external to the network system;

in response to the intercepted message being received at the gateway and before the message is forwarded to the server that is external to the network system:

comparing the user identifier to a data store comprising a plurality of user identifiers associated with subscriber profiles;

assigning, by the gateway of the network system when the user identifier matches a stored subscriber profile in the data store, the message to the stored subscriber profile based at least on one of the user identifier or a network identifier appended to a Hypertext Transfer Protocol (HTTP) header of the message by a network system component of the network system;

generating and storing, by the gateway of the network system when the user identifier does not match any stored subscriber profile in the data store, a new subscriber profile;

assigning, by the gateway of the network system, the message to the new subscriber profile based at least on one of the user identifier or the network identifier appended to the HTTP header of the message by the network system component; and adding, by the gateway of the network system, at least the interaction record to the assigned subscriber profile;

transmitting, by the gateway of the network system, the assigned subscriber profile to a classification application of the network system, wherein the classification application classifies the assigned subscriber profile based at least on the interaction record and clusters the assigned subscriber profile with at least one other subscriber profile based on the classification; and forwarding, by the gateway of the network system, the message from the gateway to the application located on the server that is external to the network system, wherein the message has the network identifier appended to the HTTP header.

10. The method of claim 9, wherein the device specific values are based on at least one of the type of device or the application technology stack.

11. The method of claim 9, wherein the sensor data further includes a time of the interaction.

12. The method of claim 9, wherein identifying comprises identifying the marker attached to the message, and wherein the marker is provided by a software development kit of an application installed on the mobile device.

13. The method of claim 9, further comprising clustering, by the classification application of the network system, the assigned subscriber profile with at least one other subscriber profile based at least on the interaction record.

14. The method of claim 9, further comprising:
identifying, by the network system, a second message from the mobile device to a second application, wherein the second message comprises the user identifier and a second interaction record based on a detection of an interaction between a second mobile device user and the mobile device;
receiving, by the gateway of the network system, the second message, wherein the gateway assigns the second message to the assigned subscriber profile, wherein the assigned subscriber profile comprises at least the interaction record of the message;
adding, by the gateway of the network system, the second interaction record of the second message to the assigned subscribe profile so that the assigned subscriber profile comprises the interaction record of the message and the second interaction record of the second message; and
transmitting, by the gateway of the network system, the assigned subscriber profile to the classification application of the network system to reclassify the assigned subscriber profile based on the addition of the second interaction record of the second message.

15. A method for collecting device sensor data while in transit via a network, the method comprising:
detecting, by a mobile device via a plurality of sensors, at least one interaction between a mobile device user and the mobile device, where the mobile device generates sensor data based on the detected interaction;
in response to detecting the interaction, attaching, by an application on the mobile device, a marker to a message that is intended for a server located external to a network system;
sending, by the mobile device, the message via the network system to the server located external to the network system;
identifying, via the marker by the network system comprising a gateway, the message being transmitted from the mobile device, through the network system, to an application located on the server, wherein the server comprising the application is connected to the network and the server is external to the network system, wherein the message requests access to the application located on the server external to the network system and the message comprises: the marker, a user identifier based on one or more mobile device specific values, and at least one interaction record having the sensor data that is based on the detection of the at least one interaction between the mobile device user and the mobile device via the plurality of sensors on the mobile device, wherein the sensor data corresponds to spatial orientation of the mobile device, movement of the mobile device, frequency of use of the mobile device, and type of mobile device use, and wherein the user identifier is identified as being associated with a mobile device owner and a network identifier is assigned to the message based on being associated with the user identifier and the mobile device owner;
in response to identifying the message, intercepting, by the gateway of the network system, the message being transmitted through the network system and receiving the message at the gateway of the network system before the message is forwarded to the application located on the server that is external to the network system;
in response to the intercepted message being received at the gateway and before the message is forwarded to the server that is external to the network system:
comparing the user identifier to a data store comprising a plurality of user identifiers associated with subscriber profiles;
assigning, by the gateway of the network system when the user identifier matches a stored subscriber profile in the data store, the message to the stored subscriber profile based on the network identifier appended to a Hypertext Transfer Protocol (HTTP) header of the message by a component of the network system, the network identifier comprising profile data corresponding to the mobile device owner;
generating and storing, by the gateway of the network system when the user identifier does not match any stored subscriber profile in the data store, a new subscriber profile;
assigning, by the gateway of the network system, the message to the new subscriber profile based at least on one of the user identifier or the network identifier appended to the HTTP header of the message by the network system component; and
adding, by the gateway of the network system, at least the at least one interaction record to the assigned subscriber profile;
transmitting, by the gateway of the network system, the assigned subscriber profile to a classification application of the network system, wherein the classification application classifies the assigned subscriber profile based at least on the profile data of the mobile device owner and the at least one interaction record; and
forwarding, by the gateway of the network system, the message from the gateway to the application located on the server that is external to the network system, wherein the message has the network identifier appended to the HTTP header.

16. The method of claim 15, wherein assigning the network identifier based on the user identifier comprises matching the mobile device owner associated with the user identifier with a mobile device owner associated with the network identifier.

17. The method of claim 15, further comprising clustering, by the classification application of the network system, the assigned subscriber profile with at least one other subscriber profile based on a similarity between the at least one interaction record of the message and an interaction record associated with the other subscriber profile.

18. The method of claim 17, wherein clustering comprises identifying at least one of a similar interaction record between the assigned subscriber profile and the at least one other subscriber profile, identifying at least one of another interaction record of the other subscriber profile which is different from any interaction record of the assigned subscriber profile, and associating the assigned subscriber profile with the different interaction record based on the similar interaction records.

19. The method of claim 15, further comprising:
identifying, by the network system, a second message from a second mobile device to a second application, wherein the second message comprises a second user identifier based on one or more second mobile device specific values and at least one interaction record based on a detection of at least one interaction between a second mobile device user and the second mobile device, wherein the second user identifier is associated with the mobile device owner;

receiving, by the component of the network system, the second message to the second application;

identifying, by the component of the network system, the second user identifier and assigning the network identifier to the second message based on the association between the second user identifier and the mobile device owner;

receiving, by the gateway of the network system, the second message, wherein the gateway assigns the second message to the assigned subscriber profile based on the network identifier, wherein the assigned subscriber profile comprises at least the profile data of the mobile device owner and the at least one interaction record of the message;

adding, by the gateway of the network system, the at least one interaction record of the second message to the assigned subscriber profile so that the assigned subscriber profile comprises the profile data of the mobile device owner, the at least one interaction record of the message, and the at least one interaction record of the second message; and transmitting, by the gateway of the network system, the assigned subscriber profile to the classification application of the network system to reclassify the assigned subscriber profile based on the addition of the at least one interaction record of the second message.

20. The method of claim 19, further comprising reclustering, by the classification application of the network system, the assigned subscriber profile based on the reclassification of the assigned subscriber profile.

* * * * *